United States Patent
Harris (10) Patent No.: US 7,642,677 B2
(45) Date of Patent: Jan. 5, 2010

(54) CONTROLLING INRUSH CURRENT FROM A POWER SUPPLY TO A LOAD

(75) Inventor: Selvakumar Peace John Harris, Penang (MY)

(73) Assignee: Motorola, Inc., Schaumburg, IL (US)

( * ) Notice: Subject to any disclaimer, the term of this patent is extended or adjusted under 35 U.S.C. 154(b) by 167 days.

(21) Appl. No.: 11/832,740

(22) Filed: Aug. 2, 2007

(65) Prior Publication Data
US 2009/0033152 A1 Feb. 5, 2009

(51) Int. Cl.
*H02B 1/24* (2006.01)
*H02H 3/00* (2006.01)

(52) U.S. Cl. .................................. 307/131; 361/94

(58) Field of Classification Search ............... 307/112, 307/131; 361/94
See application file for complete search history.

(56) References Cited

U.S. PATENT DOCUMENTS

| | | | |
|---|---|---|---|
| 5,010,293 A | 4/1991 | Ellersick | |
| 5,079,455 A | 1/1992 | McCafferty et al. | |
| 5,087,871 A | 2/1992 | Losel | |
| 5,122,724 A | 6/1992 | Criss | |
| 5,187,653 A | 2/1993 | Lorenz | |
| 5,283,707 A | 2/1994 | Conners et al. | |
| 5,374,887 A | 12/1994 | Drobnik | |
| 6,400,203 B1 * | 6/2002 | Bezzi et al. | 327/309 |
| 6,559,623 B1 * | 5/2003 | Pardoen | 323/274 |
| 7,099,135 B2 * | 8/2006 | Ball et al. | 361/93.9 |
| 7,414,335 B2 * | 8/2008 | Hussein et al. | 307/135 |
| 2006/0164778 A1 * | 7/2006 | Beletsky et al. | 361/94 |

* cited by examiner

*Primary Examiner*—Albert W Paladini
*Assistant Examiner*—Michael Rutland Wallis
(74) *Attorney, Agent, or Firm*—Simon B. Anolick; Anthony P. Curtis (57) ABSTRACT

Apparatus (100) for controlling inrush current from a power supply (250) to a load (255), the apparatus comprising a first (105a) and a second (105b) power supply input and a first (110a) and a second (110b) load output, a semiconductor device (115) coupled between the first power supply input (105a) and the first load output (110a), a control circuit (120) having a control circuit input (125) coupled to the first load output (110a) and a control circuit output (130) coupled to a conductance control node (135) of the semiconductor device (115), wherein, in use, when a load (255) is connected across the first load output (110a) and the second load output (110b), the control circuit (120) provides a control signal to the conductance control node (130) to thereby progressively vary the conductance of the semiconductor device (115) from a low conductance state to a high conductance state in response to a load signal being provided to the control circuit input (125) indicating that a load current (Isd) flowing through the semiconductor device (115) has exceeded a pre-determined threshold.

15 Claims, 4 Drawing Sheets

CONTROLLING INRUSH CURRENT FROM A POWER SUPPLY TO A LOAD

FIELD OF THE INVENTION

The present invention relates generally to the field of power supplies and in particular the control of inrush current upon the connection of reactive loads.

BACKGROUND OF THE INVENTION

An inrush current is a transient condition where the initial current flowing from a power supply to a newly connected load is much higher than the steady state condition. An inrush current of many times the steady state current rushes into the load to charge the capacitive part of the load before the current settles down to be dependent on the resistive part of the load. Inrush currents are undesirable for a number of reasons, including a drop in supply voltage to other loads connected to the power supply. In addition protection circuits may misinterpret the inrush current as a fault and trip the load. Also, in explosive atmospheres, an inrush current may cause sparking potentially resulting in an explosion.

A number of current limiting circuits are available for incorporation into capacitive loads and which use a semiconductor device such as a FET in the load path between the power supply and load. A sensor resistor also in the load path may be used to determine the load current and reduce the conductance of the semiconductor device in response to detecting an inrush current. Alternatively, the conductance of the FET may be slowly increased after the load is connected, so that the initial inrush current is again limited by the initial low conductance of the FET.

BRIEF DESCRIPTION OF THE DRAWINGS

In order that the invention may be readily understood and put into practical effect, reference will now be made to an exemplary embodiment as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components and system components related to controlling inrush current upon connection of a load. Accordingly, the apparatus components, system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the method, or apparatus that comprises the element.

Methods, systems and apparatus for the function of controlling inrush current upon connection of a load have been described herein. Further, it is expected that one of ordinary skill, notwithstanding possibly significant effort and many design choices motivated by, for example, available time, current technology, and economic considerations, when guided by the concepts and principles disclosed herein will be readily capable of generating alternative means and methods to those described herein.

According to one aspect of the present invention there is provided an apparatus for controlling inrush current from a power supply to a load, the apparatus comprising: a first and a second power supply input and a first and a second load output; a semiconductor device coupled between the first power supply input and the first load output; a control circuit having a control circuit input coupled to the first load output and a control circuit output coupled to a conductance control node of the semiconductor device, wherein, in use, when a load is connected across the first load output and the second load output, the control circuit provides a control signal to the conductance control node to thereby progressively vary the conductance of the semiconductor device from a low conductance state to a high conductance state in response to a load signal being provided to the control circuit input indicating that a load current flowing through the semiconductor device has exceeded a pre-determined threshold.

According to another aspect of the present invention there is provide a power supply system comprising: a power supply coupled to an apparatus for controlling inrush current from the power supply to a load, the apparatus comprising: a first and a second power supply input coupled to the power supply, and a first and a second load output; a semiconductor device coupled between the first power supply input and the first load output; a control circuit having a control circuit input coupled to the first load output and a control circuit output coupled to a conductance control node of the semiconductor device, wherein, in use, when a load is connected across the first load output and the second load output, the control circuit provides a control signal to the conductance control node to thereby progressively vary the conductance of the semiconductor device from a low conductance state to a high conductance state in response to a load signal being provided to the control circuit input indicating that a load current flowing through the semiconductor device has exceeded a pre-determined threshold.

According to another aspect of the present invention there is provide a method of controlling inrush current from a power supply to a load, the method comprising: progressively varying the conductance of a semiconductor device coupled between the power supply and the load from a low conductance state to a high conductance state in response to detecting connection of the load to the semiconductor device by determining that a load current flowing through the semiconductor device has exceeded a pre-determined threshold.

Figure 1:
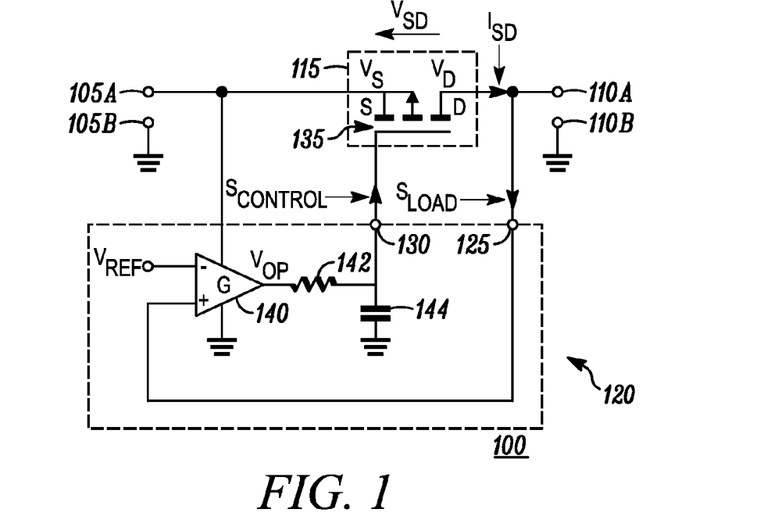
FIG. 1 is a schematic block diagram illustrating circuitry of an apparatus for controlling inrush current in accordance with the invention.

Referring to FIG. 1, there is shown a schematic diagram illustrating an apparatus 100 for controlling inrush current from a power supply to a load. The apparatus 100 comprises a first 105a and a second 105b power supply input for coupling to a power supply, and a first 110a and a second 110b load output for coupling to a load. A semiconductor device 115 such as a field effect transistor (FET) has its conduction channel coupled between the first power supply input 105a and the first load output 110a. An example semiconductor device is a p-channel MOSFET which has its source (S) and drain (D) connected to the first power supply input 105a and the first load output 110a respectively. The apparatus 100 also comprises a control circuit 120 having a control circuit input 125 coupled to the first load output 110a and a control circuit output 130 coupled to a conductance control node 135 or gate of the semiconductor device 115. A control signal $S_{control}$ from the control circuit output 130 to the conductance control node 135 controls the conductance of the conduction channel of the semiconductor device 115. By varying the control signal, the conductance of the semiconductor device 115 and hence the load path between the power supply and the load can be varied. A load signal $S_{load}$ from the first load output 110a or drain D of the semiconductor device 115 indicates the voltage Vd at these nodes.

The control circuit 120 comprises an op amp 140 having a non-inverting input connected to the control circuit input 125 and an inverting input connected to a reference voltage Vref. The non-inverting input of the op amp 140, or equivalent amplifier, receives the load signal $S_{load}$ indicating the voltage Vd at the drain of the FET 115 or the first load output 110a. The output of the op amp 140 is connected to a control resistor 142. The control resistor 142 is also connected to a control capacitor 144 and the control circuit output 130. The control capacitor 144 is also connected to the second power supply input 105b and/or the second load output 110b. The control resistor 142 and control capacitor 144 form an RC network having a time constant or predetermined duration dependent on the values of the control resistor 142 and control capacitor 144 as will be appreciated by those skilled in the art. The node of the RC network which is also connected to the control circuit output 130 will follow the voltage $V_{op}$ at the output of the op amp 140 dependent on the time constant.

Initially, before connection of a load, the semiconductor device 115 is biased, by the op amp 140, such that it barely conducts. Typically the voltage $V_{op}$ at the output of the op amp 140, and hence at the conductance control node 135 of the semiconductor device 115, will be the threshold voltage of the FET forming the semiconductor device 115. The semiconductor device 115 in this low conduction state acts as a high resistance. As there is no load current without a load connected, the drain voltage Vd will therefore be the same as the source voltage Vs.

The op amp 140 compares the reference voltage Vref against the drain voltage Vd of the semiconductor device 115. The reference voltage Vref is set at slightly less than the source voltage Vs of the semiconductor device 115 in order that the difference between the reference voltage Vref and the drain voltage Vd with no load connected (ie Vs) is more than the input offset voltage of the op amp 140. As described above, the op amp is biased to output a voltage $V_{op}$ sufficient to maintain the semiconductor device 115 in a low conduction state—typically $V_{op}$ will be the threshold voltage of the FET used as the semiconductor device 115.

When a load is connected across the first and second outputs 110a, 110b, a current $I_{sd}$ will flow through the semiconductor device 115 to the load, and hence a voltage drop $V_{sd}$ will develop between the source S and drain D of the semiconductor device 115 due to its resistance or low conductance. This voltage drop $V_{sd}$ will lower the drain voltage Vd resulting in a change to the load signal $S_{load}$ provided to the control circuit input 125 and hence op amp 140. This change in load signal $S_{load}$ indicates that the load current Isd flowing through the semiconductor device has increased, in turn indicating that a load has been connected between the two load outputs 110a, 110b.

When load current Isd reaches a pre-determined threshold, the corresponding drain voltage Vd falls such that the op amp is now amplifying a negative difference (Vd−Vref) rather than a small positive difference (Vs−Vref). Thus the drain voltage Vd is less than Vref (and typically also the op amp's input offset voltage). This means that the difference between the two op amp inputs become negative resulting in the op amp outputting a low voltage Vop. With a high gain G op amp, the output voltage Vop will typically be the negative supply rail or ground voltage. Such a low voltage Vop, once propagated to the conductance control node 135, will cause the semiconductor device 115 to move to a high conductance state where it will present very little resistance to the load current Isd. However this low voltage Vop takes some time to propagate from the op amp 144 to the conductance control node 135 due to the RC network of the intermediate control resistor 142 and control capacitor 144.

As will be appreciated, the control signal $S_{control}$ will ramp down or progressively vary from the threshold voltage of the semiconductor device 115 to the lower voltage Vop at the op amp output. This in turn means that the conductance of the semiconductor device 115 will ramp up or progressively vary from the low conductance state to the high conductance state. With a suitable time constant for the RC network 142, 144, the inrush current associated with connection of a capacitive load is limited by the initial low conductance state of the semiconductor device 115. Over a predetermined duration which is the time constant of the RC network, the conductance of the semiconductor device 115 increases to its high conductance state. Thus when the capacitance of the load is fully charged, and the load current Isd is at its steady state level, the semiconductor device 115 presents very little resistance to the load current Isd. The inrush current is therefore controlled by only slowly increasing the conductance of the semiconductor device 115 following connection of the load.

Effectively then, the provision of the load signal $S_{load}$ indicating that the load current Isd flowing through the semiconductor device 115 has exceeded a pre-determined threshold causes the op amp to switch from a high to a low output voltage Vop. For a p-channel MOSFET, this switch in op amp output voltage Vop results in a transition from a low source to gate voltage (i.e. threshold voltage) to a high source to gate voltage (eg 7.6V). Due to the action of the RC network 142, 144, the change in op amp output voltage Vop progressively varies the conductance of the semiconductor device 115 from a low conductance state which limits the inrush current to a high conductance state once a steady state load current has been established.

In an embodiment, the time constant or predetermined duration over which the control signal progressively varies the conductance of the semiconductor device from the low conductance state to the high conductance state is arranged to be dependent on the capacitance of the connected load so that the semiconductor device 115 is fully conductive only once the capacitance of the load is fully charged. This arrangement controls the inrush current normally associated with connection of a capacitive load, the semiconductor initially being high resistance to limit this inrush current, and then over the predetermined period progressively becoming low resistance in order to present very little resistance to the steady state current.

Figure 2:
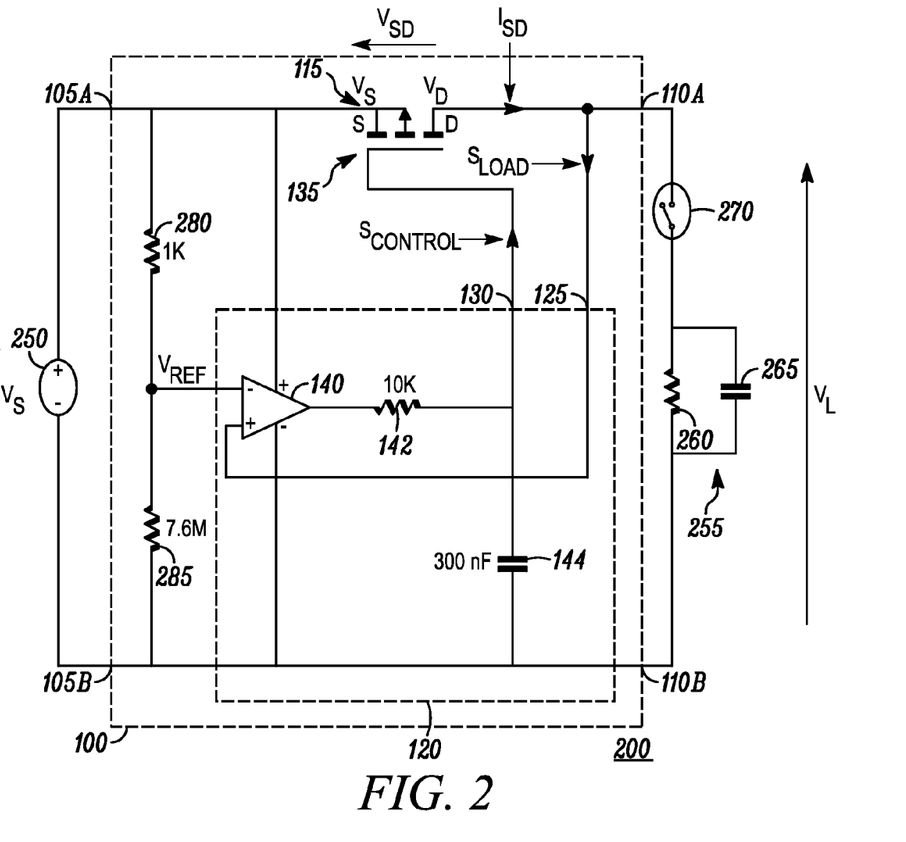
FIG. 2 is a schematic block diagram illustrating circuitry of a power supply system in accordance with the invention.

Referring to FIG. 2, there is shown a schematic diagram illustrating a power supply system 200 for supplying power to a load. The power supply system includes a power supply 250 coupled to the apparatus 100 of FIG. 2, which in turn is coupled to a load 255 by a switch 270. The load 255 comprises a resistive part 260 and a capacitive part 265. The voltage Vs at the source S of the semiconductor device 115 is the same as the voltage provided by the power supply 250. The reference voltage Vref is provided using a voltage divider comprising resistors 280 and 285 coupled between the first and second power supply inputs 105a, 105b as shown. The semiconductor device 115 in this embodiment is a p-channel MOSFET, such as the Si9435DY from Fairchild Semiconductor. An example op amp 140 is the LT1498 available from Linear Technology. Example values for the various components 280, 285, 142, 144, 260, 265 are also shown, and correspond to voltage and current graphs in subsequent figures and which are described in more detail below.

Operation of the power supply system 200 of FIG. 2 is described below with reference also to FIG. 8 which is a flow chart of a method of controlling inrush current. As previously described, a load signal $S_{load}$ is provided to the control circuit input 125 from the first load output 110a. When the switch 270 is open and the load 255 is not connected to the apparatus 100, the load signal $S_{load}$ will indicate a drain voltage Vd at almost the source voltage Vs. The drain voltage Vd will therefore be equal to the reference voltage Vref added together with the op amp input offset voltage. The reference voltage Vref is slightly less than the source voltage Vs, and which is provided by the action of the voltage divider 280, 285. This configuration biases the load signal $S_{load}$ to have a voltage (Vd) slightly less than the source voltage Vs. This results in the op amp 140 output being high, and at the threshold voltage of the MOSFET 115. This high voltage bias is passed on by the control resistor 142 and control capacitor 144 of the RC network to the conductance control node 135 of the semiconductor device 115 as the control signal $S_{control}$; turning the semiconductor device 115 almost but not quite off—a low conductance state. This provides a negative feedback arrangement which prevents the semiconductor device 115 from being turned completely off.

Figure 3:
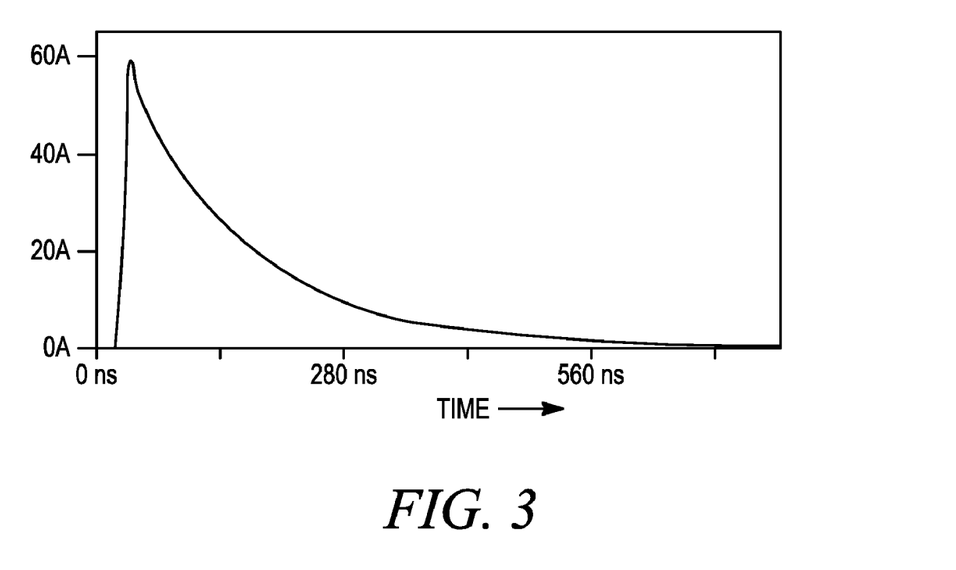
FIG. 3 is a graph of inrush current associated with a power supply system without inrush current control.
Figure 4:
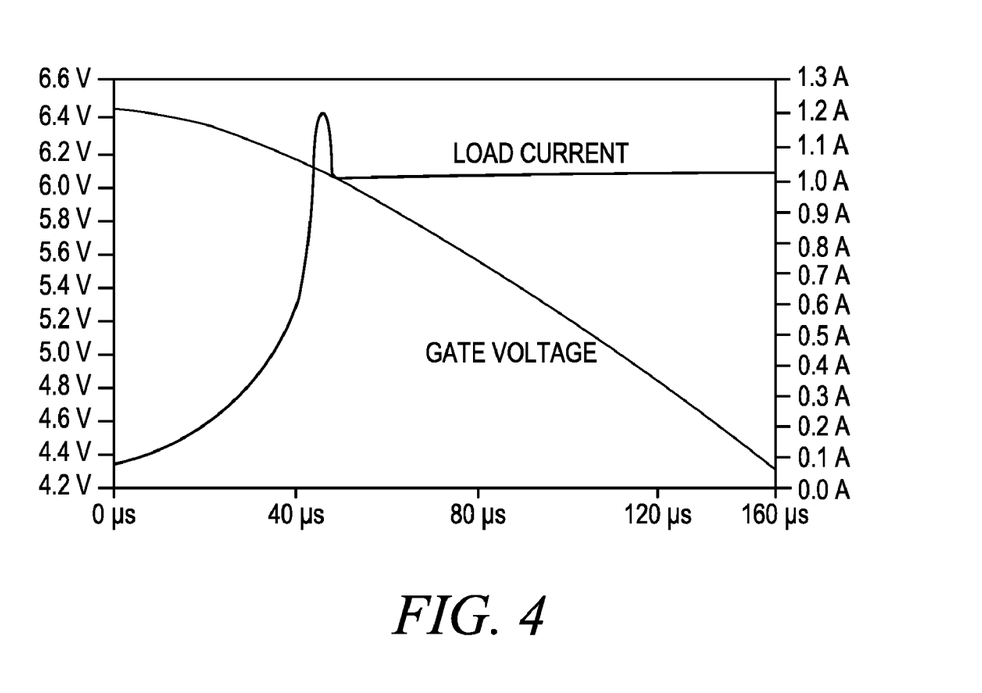
FIG. 4 is a graph of inrush current and the gate control voltage associated with a power supply system of FIG. 2.

In the embodiment, the power supply 250 provides 7.6V and has a series resistance of 0.04 ohm. The input offset voltage of the op amp 140 is less than 1 mV. Hence Vref is set 1 mV less than Vs to about 7.599V. With a load resistance 260 of 7.6 ohm, a steady state current after connection of the load of 1 A is implied. Without the apparatus 100 controlling the inrush current, an inrush current exceeding 50A would initially be produced as illustrated in FIG. 3. The steady state current of 1A is reached after approximately 500 ns. With the low conductance semiconductor device 115 in the load path however, the initial inrush current is limited to approximately 1.2A as shown in FIG. 4. Operation of this embodiment is described in more detail in the following.

The output voltage of the op amp 140 is given by:

$$Vop = G(Vd - 7.599) \qquad (i)$$

where G is the open loop gain of the op amp which is very high. Vref must be less than Vs by the input offset voltage of the op amp. If Vref is connected directly to Vs, due to the uncertainty of the input offset voltage of the op amp, the semiconductor device 115 could be in a high conductance state when no load is applied. As Vop is initially to be set to the threshold voltage of the MOSFET 115, Vd needs to be set less than Vs.

During steady state conditions, no current flows through the RC network of control resistor 142 and control capacitor 144. Therefore, the voltage at the gate or conductance control node 135 of the MOSFET 115 is the voltage of the op amp output $V_{op}$. The saturated current Isd flowing through the MOSFET 115 can be approximated as follows:

$$Isd = K(V_S - V_{op} - V_T)^2 \qquad (ii)$$

K and $V_T$ (threshold voltage) are constants dependent on the MOSFET. $V_S$ is the voltage at the source S node of the MOSFET 115 with respect to ground (105b, 110b).

During steady state conditions, no current flows through the capacitive part 265 of the load 255. The voltage at the MOSFET drain Vd is given by $$Vd = Isd * R_L \qquad (iii)$$

where $R_L$ is the value of the resistive part 260 of the load. In order to avoid dissipating heat during steady state conditions, the voltage Vd at the drain of the MOSFET 115 should be comparable to the voltage of the source Vs. Using equations (ii) and (iii), Isd can be eliminated, and Vd vs. Vop can be plotted with different values of $R_L$.

$$Vd = K R_L (V_S - Vop - V_T)^2 \qquad (iv)$$

Figure 5:
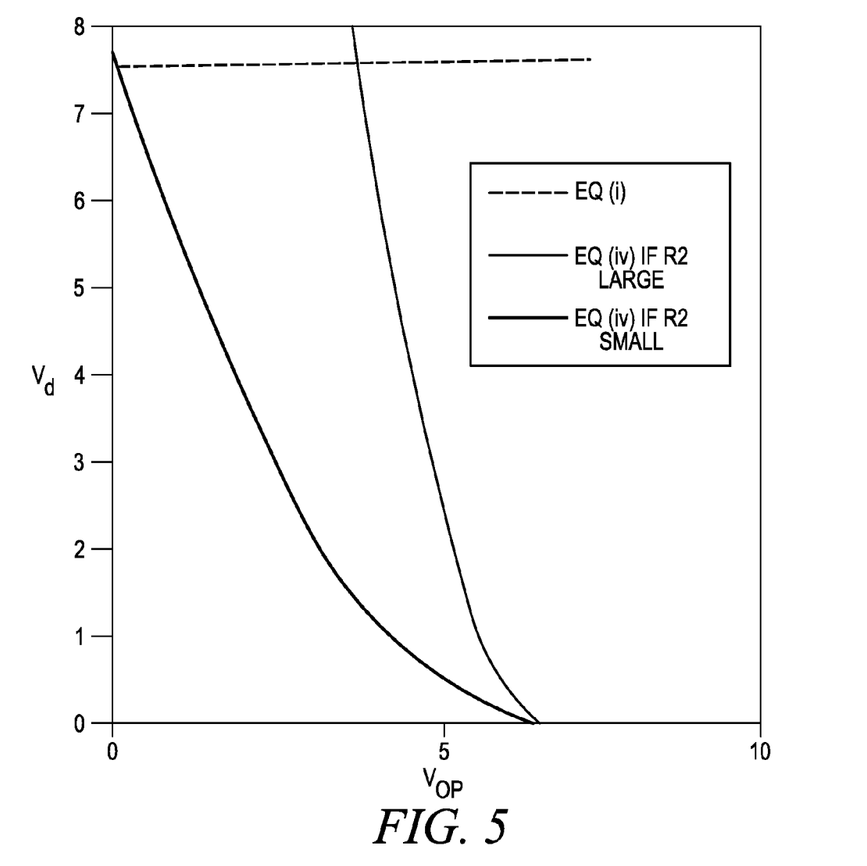
FIG. 5 is a graph of equations (i) and (iv) to determine the semiconductor device drain voltage and the op amp output voltage of the power supply system of FIG. 2 if the resistive load is varied.

The intersection of equation (iv) with equation (i) gives the steady state voltages of the drain Vd and gate Vop nodes of the MOSFET. The plot of the steady state gate and drain voltages of the MOSFET is shown in FIG. 5 for a small $R_L$ and a large $R_L$.

Figure 6:
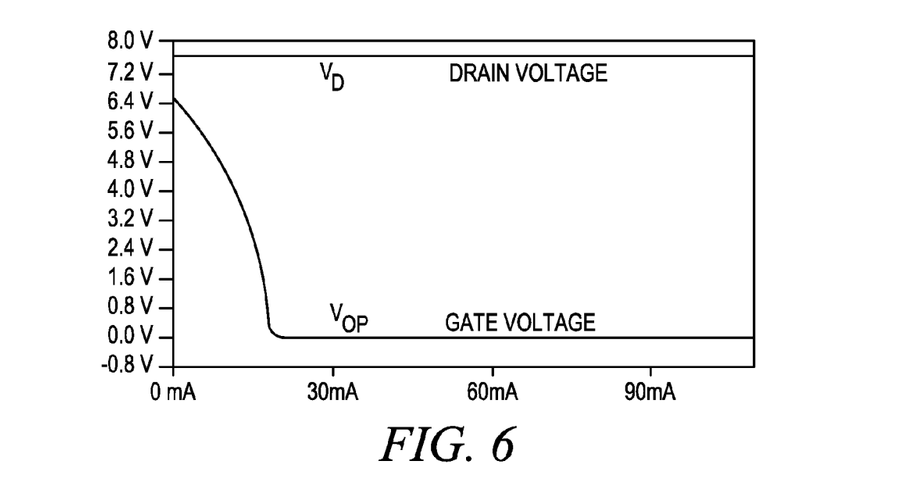
FIG. 6 is a graph of the semiconductor device drain voltage and the gate voltage of the power supply system of FIG. 2 as the steady state load current is varied.

FIG. 6 illustrates the steady state voltage at the drain Vd and the gate (Vop at steady state) as the load current Isd is varied. It can be seen that for load currents above 20 mA, the voltage at the gate or conductance control node 135 of the semiconductor device 115 is as low as possible—negative rail or in this case ground. The load current Isd flowing causes a voltage drop across the MOSFET (between the source S and drain D) which switches on the MOSFET permanently and prevents oscillations. However, if the load current is very small, the FET would operate in the linear range and this could give rise to oscillations. To prevent this, a Miller capacitor can be added from the output of the op-amp to its inverting terminal.

As previously noted, once the op amp output voltage Vop changes, this will be reflected at the MOSFET gate 135 only progressively, due to the action of the RC network 142, 144. The values of the control resistor 142 and the control capacitor 144 will determine the time taken for the voltage at the gate 135 to decrease when the load 255 is applied or connected. This time constant, if smaller than the time taken for the capacitive part 265 of the load 255 to charge, would be of limited use in limiting the surge or inrush current. On the other hand, if the time constant or predetermined duration was too big, the time taken to reach steady state conditions may be unnecessarily too long. A long time constant could even be dangerous as heat would be dissipated in the MOSFET when the voltage drop Vsd across its channel is large and a high current is flowing.

To determine a suitable time constant or predetermined duration, it can be assumed that the current flowing through resistive part 260 of the load 255 is initially negligible. Letting $I_T$ be the permissible inrush current, and assuming that the load current Isd increases linearly from 0 to $I_T$ within $T_C$ (the time constant or predetermined duration), then on average, during the transient state, the current is $I_T/2$. With an average current of $I_T/2$ flowing, the time taken, $T_C$, for the capacitive part 265 to get fully charged to $V_S$ is $$T_C = 2 * C_L * V_S / I_T \quad (V)$$

where $C_L$ is the capacitance value of the capacitive part 265 of the load. The voltage at the gate 135 of the FET when there is no load ($V_0$) is given by $$V_0 = V_S - V_T \quad (vi)$$

When $I_T$ is flowing, the voltage at the gate of the FET, ($V_1$) is $$V_1 = V_S - V_T - \sqrt{I_T/K} \quad (viii)$$

Ensuring that the voltage at the gate 135 doesn't decrease below $V_1$ within $T_C$, implies that the inrush current does not exceed $I_T$ within this time.

The voltage across the RC network control resistor 142 as the op amp charges the control capacitor 144 when a load is applied can be approximated as $V_S - V_T$. The voltage at the other node of the RC network control resistor 142 is assumed to be constant during the time $T_C$ since $\sqrt{(I_T/K)}$ is small compared to $V_S - V_T$. Thus the current required to charge the RC network capacitor 144 linearly such that the gate voltage decreases from $V_0$ to $V_1$ in time $T_C$ is given by $$i = \frac{V_S - V_T}{R_1} = C_1 \frac{V_0 - V_1}{T_C} \quad (viii)$$

From equations (v) to (viii), $R_1 C_1$ can be computed as:

$$R_1 C_1 = \frac{2 C_L V_S (V_S - V_T) K^{1/2}}{I_T^{3/2}} \quad (ix)$$

Figure 7:
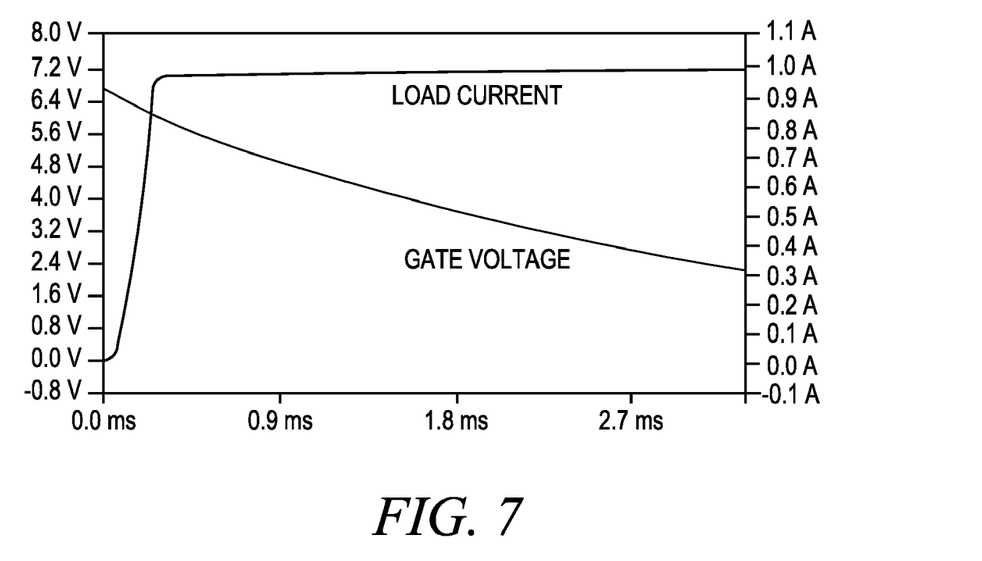
FIG. 7 is a graph of inrush current associated with a power supply system of FIG. 2 with a longer predetermined duration than that of FIG. 4.

Substituting the numerical values of the circuit shown in FIG. 2, with $I_T=1A$, $K=10A/V^2$, $V_S=7.6V$, $C_L=1$ uF and $V_T=1V$, a time constant of 317 μs is obtained. The load current graph shown in FIG. 4 uses a time constant of 300 μs, with the control capacitance of the RC network control capacitor 144 being 30 nF. However by increasing this capacitance to 300 nF a time constant of 3 ms is obtained. This results in the load current graph of FIG. 7. It can be seen that this arrangement of the apparatus 100 eliminates inrush current following connection of the load 255, whilst achieving steady state load current Isd within approximately 3 ms. The gate voltage of the MOSFET can be seen falling largely linearly in order to implement this. Once this has fallen completely to ground (0V), the capacitive part 265 of the load 255 is fully charged, and the full load current Isd is flowing through the resistive part 260 of the load 255.

These embodiments control the inrush current when a capacitive load 255 is connected to a power supply 250; for example when the switch 270 is closed. This allows the apparatus 100 for controlling inrush current to be incorporated within a power supply system 200 including the power supply 250, rather than within the load 255 as is more usual. This in turn means that no modifications to loads are required in order to couple the load to the power supply. Control of inrush current is automatically implemented by the apparatus 100 within the power supply system 200. This simplifies installation and reduces costs. By controlling the inrush current without the use of a sensor resistor, steady state heat dissipation is reduced, and efficiency of the power supply is increased. Furthermore, control of the inrush current reduces the impact of connecting the load on other loads which may be coupled to the power supply 250. In addition, the reduced or eliminated inrush current reduces the possibility of sparking and hence explosions in volatile environments.

Figure 8:
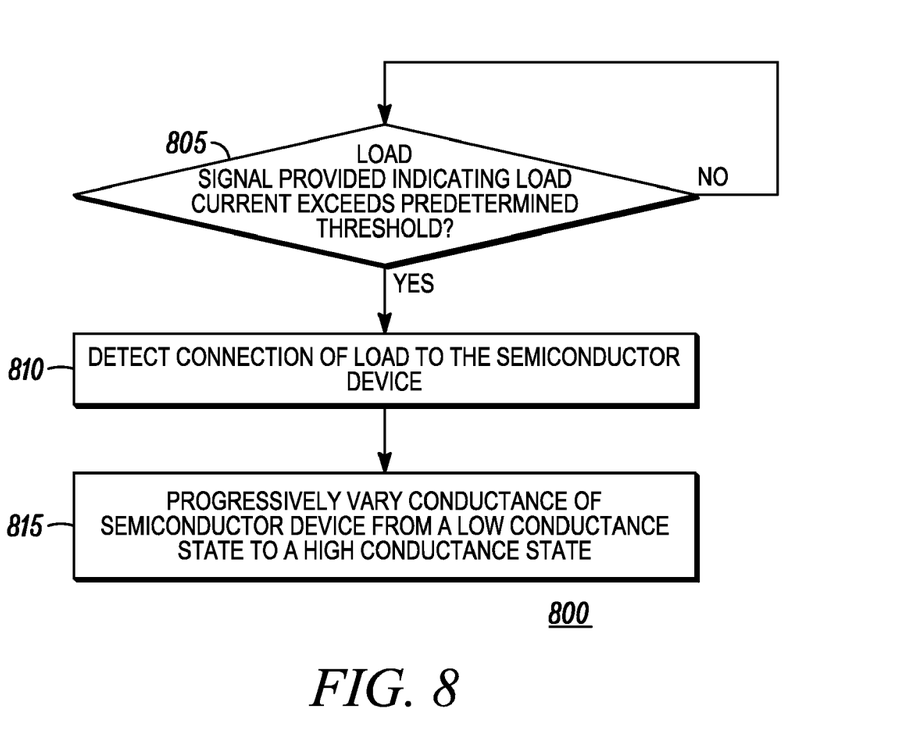
FIG. 8 illustrates a method of operating the apparatus for controlling inrush current of FIG. 1.

FIG. 8 is a flow chart illustrating a method of operating the power supply system 200 of FIG. 2. The method 800 controls inrush current using a semiconductor device 115. The method initially monitors the load signal $S_{load}$ for an indication that the load current Isd has exceeded a predetermined threshold at step 805. Before connection of a load 255, the load signal will indicate a low or zero load current flowing through the semiconductor device 115=Vd=Vs. Following connection of a load however, a load current Isd begins to flow which is accompanied by a fall in the drain voltage Vd. This fall in the drain voltage Vd, is caused by the voltage drop Vsd across the semiconductor device 115 from the load current Isd and the resistance of the semiconductor device 115. Alternatively the load signal may indicate the voltage $V_L$ across the load. Knowing the drain voltage Vd or the load voltage VL and the semiconductor device resistance or the load resistance respectively may provide the load current Isd. In the embodiments, the determining whether the load current has exceeded a predetermined threshold is implemented by comparing the drain voltage Vd with a reference voltage Vref which is related to the source voltage Vs. A sufficient difference in these two voltages is sufficient to indicate that the load current has exceeded the predetermined threshold. Determining that this predetermined threshold has been exceeded (805Y) corresponds to detecting the connection of the load 255 to the semiconductor device at step 810. The method then progressively varies the conductance of the semiconductor device coupled between the power supply and the load 255 from a low conductance state to a high conductance state at step 815. This step is implemented in the described embodiments by the op amp 140 outputting a low voltage Vop, which is propagated to the conductance control node 135 of the semiconductor device 115 via a control resistor 142 and a control capacitor 144 which together form an RC network. Thus the change in op amp output voltage Vop is only gradually applied to the semiconductor gate 135, resulting in the progressive change in conductance. Thus the semiconductor device 115 initially presents a high resistance in the load path which limits the inrush current. However under steady state conditions, the semiconductor device 115 presents a low resistance in the load path.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims.

I claim:

1. Apparatus for controlling inrush current from a power supply to a load, the apparatus comprising:
    a first and a second power supply input and a first and a second load output;
    a semiconductor device coupled between the first power supply input and the first load output;
    a control circuit having a control circuit input coupled to the first load output and a control circuit output coupled to a conductance control node of the semiconductor device,
    wherein the apparatus is configured such that when a load is connected across the first load output and the second load output, the control circuit provides a control signal to the conductance control node to thereby progressively vary the conductance of the semiconductor device from a low conductance state to a high conductance state in response to a load signal being provided to the control circuit input indicating that a load current flowing through the semiconductor device has exceeded a pre-determined threshold,
    wherein the load signal is indicative of a voltage at the first load output and the control circuit is arranged to provide the control signal in response to determining whether the voltage at the first load output is less than a threshold voltage, and
    wherein the control circuit comprises an op amp having a voltage output coupled to a control resistor and a control capacitor which is also coupled to the conductance control node of the semiconductor device, the op amp having inputs coupled to the control circuit input and the threshold voltage.

2. Apparatus as claimed in claim 1, wherein the conductance of the semiconductor device is progressively varied from the low conductance state to the high conductance state over a predetermined duration dependent on a capacitance of the load.

3. Apparatus as claimed in claim 2, wherein the predetermined duration is at least the duration required to allow the capacitance of the load to charge to a steady state voltage between the first and second load outputs of the apparatus.

4. Apparatus as claimed in claim 1, wherein the semiconductor device comprises a p-channel MOSFET.

5. Apparatus as claimed in claim 1, further comprising a voltage divider coupled between the first and second power supply inputs of the apparatus in order to generate the threshold voltage.

6. A power supply system comprising:
    a power supply coupled to an apparatus for controlling inrush current from the power supply to a load, the apparatus comprising:
        a first and a second power supply input coupled to the power supply, and a first and a second load output;
        a semiconductor device coupled between the first power supply input and the first load output;
        a control circuit having a control circuit input coupled to the first load output and a control circuit output coupled to a conductance control node of the semiconductor device,
        wherein the apparatus is configured such that when a load is connected across the first load output and the second load output, the control circuit provides a control signal to the conductance control node to thereby progressively vary the conductance of the semiconductor device from a low conductance state to a high conductance state in response to a load signal being provided to the control circuit input indicating that a load current flowing through the semiconductor device has exceeded a pre-determined threshold,
        wherein the load signal is indicative of a voltage at the first load output and the control circuit is arranged to provide the control signal in response to determining whether the voltage at the first load output is less than a threshold voltage, and
        wherein the control circuit comprises an op amp having a voltage output coupled to a control resistor and a control capacitor which is also coupled to the conductance control node of the semiconductor device, the op amp having inputs coupled to the control circuit input and the threshold voltage.

7. A method of controlling inrush current from a power supply to a load, the method comprising:
    progressively varying the conductance of a semiconductor device coupled between the power supply and the load from a low conductance state to a high conductance state in response to detecting connection of the load to the semiconductor device by determining that a load current flowing through the semiconductor device has exceeded a pre-determined threshold by determining that a voltage at a load output node coupled between the semiconductor device and the load exceeds a threshold voltage, the varying of the semiconductor device employing voltage control and having a predetermined duration dependent on a capacitance of the load,
    wherein the duration RC is:

$$RC \geq \tau = \frac{2C_L V_S (V_S - V_T) K^{1/2}}{I_T^{3/2}}$$

where $C_L$, is a capacitance value of a capacitive part of the load, K and $V_T$ (threshold voltage) are constants dependent on the semiconductor device, $V_s$ is a voltage at a source of the semiconductor device, and $I_T$ is a permissible inrush current.

8. A method of controlling inrush current as claimed in claim 7, wherein determining that a load current flowing through the semiconductor device has exceeded a pre-determined threshold comprises detecting a predetermined semiconductor device voltage across the semiconductor device.

9. A method of controlling inrush current as claimed in claim 7, wherein determining that a load current flowing through the semiconductor device has exceeded a pre-determined threshold comprises detecting a predetermined load voltage across the load.

10. A method of controlling inrush current as claimed in claim 7, wherein the predetermined duration is at least the duration required to allow the capacitive load to charge to a steady state voltage.

11. Apparatus of claim 1, wherein an RC time constant of the control resistor and control capacitor is:

$$RC \geq \tau = \frac{2C_L V_S (V_S - V_T) K^{1/2}}{I_T^{3/2}}$$

where $C_L$ is a capacitance value of a capacitive part of the load, K and $V_T$ (threshold voltage) are constants dependent on the semiconductor device, $V_s$ is a voltage at a source of the semiconductor device, and $I_T$ is a permissible inrush current.

12. Apparatus of claim 11, wherein the RC time constant is at least several times $\tau$.

13. The power supply system of claim 6, wherein an RC time constant of the control resistor and control capacitor is:

$$RC \geq \tau = \frac{2C_L V_S (V_S - V_T) K^{1/2}}{I_T^{3/2}}$$

where $C_L$ is a capacitance value of a capacitive part of the load, K and $V_T$ (threshold voltage) are constants dependent on the semiconductor device, $V_s$ is a voltage at a source of the semiconductor device, and $I_T$ is a permissible inrush current.

14. The power supply system of claim 13, wherein the RC time constant is at least several times $\tau$.

15. The method of claim 7, wherein the duration RC is at least several times $\tau$.

\* \* \* \* \*

UNITED STATES PATENT AND TRADEMARK OFFICE
CERTIFICATE OF CORRECTION

PATENT NO. : 7,642,677 B2  Page 1 of 1
APPLICATION NO. : 11/832740
DATED : January 5, 2010
INVENTOR(S) : Harris It is certified that error appears in the above-identified patent and that said Letters Patent is hereby corrected as shown below:

IN THE SPECIFICATION

1. In Column 7, Line 35, in Equation "(viii)", delete " $V_S - V_T - \sqrt{I_{T/K}}$ ," and insert -- $V_S - V_T - \sqrt{I_T/K}$ --, therefor.

IN THE CLAIMS

2. In Column 10, Line 53, in Claim 7, delete "C$_L$," and insert -- C$_L$ --, therefor.

3. In Column 10, Line 54, in Claim 7, delete "arc" and insert -- are --, therefor.

Signed and Sealed this
Twenty-first Day of February, 2012

David J. Kappos
*Director of the United States Patent and Trademark Office*